United States Patent
Bailly et al.

(10) Patent No.: US 10,350,830 B2
(45) Date of Patent: Jul. 16, 2019

(54) METHOD FOR ASSEMBLING A SET OF COMPOSITE PARTS AND ASSEMBLY OBTAINED BY SUCH A METHOD

(71) Applicant: DAHER AEROSPACE, Saint Julien de Chedon (FR)

(72) Inventors: Dominique Bailly, La Chevrolière (FR); Cédric Blanchegorge, Amboise (FR); Elric Minard, La Croix en Touraine (FR)

(73) Assignee: DAHER AEROSPACE, Saint Julien de Chedon (FR)

( * ) Notice: Subject to any disclaimer, the term of this patent is extended or adjusted under 35 U.S.C. 154(b) by 389 days.

(21) Appl. No.: 15/317,955

(22) PCT Filed: Jun. 10, 2015

(86) PCT No.: PCT/EP2015/062889
§ 371 (c)(1),
(2) Date: Mar. 25, 2017

(87) PCT Pub. No.: WO2015/189242
PCT Pub. Date: Dec. 17, 2015

(65) Prior Publication Data
US 2017/0232662 A1 Aug. 17, 2017

(30) Foreign Application Priority Data

Jun. 10, 2014 (FR) ...................................... 14 55249

(51) Int. Cl.
*B29C 65/48* (2006.01)
*B29C 65/50* (2006.01)
(Continued)

(52) U.S. Cl.
CPC .......... *B29C 65/48* (2013.01); *B29C 65/5014* (2013.01); *B29C 65/5042* (2013.01); *B29C 65/601* (2013.01); *B29C 65/72* (2013.01); *B29C 66/301* (2013.01); *B29C 66/543* (2013.01); *B29C 66/721* (2013.01); *B64C 3/185* (2013.01); *B64C 3/187* (2013.01); *B64C 3/22* (2013.01); *B64C 3/26* (2013.01); *B29C 66/71* (2013.01); *B29L 2031/3085* (2013.01)

(58) Field of Classification Search
CPC . B29C 65/48; B29C 65/5014; B29C 65/5042; B29C 65/601; B29C 65/72; B29C 66/543; B29C 66/721; B29C 66/301; B29C 66/71; B64C 3/22; B64C 3/187; B64C 3/185; B64C 3/26; B29L 2031/3085
See application file for complete search history.

(56) References Cited

U.S. PATENT DOCUMENTS 5,847,375 A * 12/1998 Matsen ................ B21D 26/055
219/635
5,866,272 A * 2/1999 Westre ...................... B32B 3/12
428/593
(Continued)

FOREIGN PATENT DOCUMENTS

EP 2 703 283 A2 3/2014
EP 2703283 A2 * 3/2014 ............... B64C 3/20
(Continued)

*Primary Examiner* — Assres H Woldemaryam
(74) *Attorney, Agent, or Firm* — IM IP Law; C. Andrew Im; Chai Im

(57) ABSTRACT

A method for assembling a box structure includes elementary parts assembled along an understructure of stiffeners and skins. The understructure and skins are made of composite material with a polymer matrix. The method includes sizing the box structure for the loads to which it is subjected and for a glued assembly. A map of the loads on the structure is obtained and a first load limit is defined depending on the probability of the structure being damaged. The understructure and the skins are assembled by gluing them. An additional layer is applied that covers the assembled elementary parts to areas of the assembled box structure where the first load limit is reached.

8 Claims, 3 Drawing Sheets

(51) Int. Cl.
*B29C 65/60* (2006.01)
*B29C 65/72* (2006.01)
*B29C 65/00* (2006.01)
*B64C 3/18* (2006.01)
*B64C 3/26* (2006.01)
*B64C 3/22* (2006.01)
*B29L 31/30* (2006.01)

(56) References Cited

U.S. PATENT DOCUMENTS

| | | | | |
|---|---|---|---|---|
| 6,849,150 | B1* | 2/2005 | Schmidt | B33Y 50/00 |
| | | | | 156/285 |
| 9,919,785 | B2* | 3/2018 | Arana Hidalgo | B64C 1/064 |
| 2009/0068365 | A1* | 3/2009 | Obermeyer | B29C 66/721 |
| | | | | 427/385.5 |
| 2012/0308770 | A1* | 12/2012 | Eli-Eli | B29C 70/22 |
| | | | | 428/120 |
| 2014/0061385 | A1* | 3/2014 | Dan-Jumbo | B64C 3/20 |
| | | | | 244/123.1 |
| 2015/0183506 | A1* | 7/2015 | Garc A Mart N | B32B 37/02 |
| | | | | 244/123.1 |

FOREIGN PATENT DOCUMENTS

FR     2 576 279 A1    7/1986
WO    2013/038012 A1   3/2013

* cited by examiner

METHOD FOR ASSEMBLING A SET OF COMPOSITE PARTS AND ASSEMBLY OBTAINED BY SUCH A METHOD

RELATED APPLICATIONS

This application is a § 371 application from PCT/EP2015/062889 filed Jun. 10, 2015, which claims priority from French Patent Application No. 14 55249 filed Jun. 10, 2014, each of which is herein incorporated by reference in its entirety.

FIELD OF THE INVENTION

The invention relates to a method for making an assembly of composite parts, and a structural assembly obtained using such a method. The invention is more specifically intended for application in aeronautics, particularly for making aircraft wings.

BACKGROUND OF THE INVENTION

Document WO 2013/038012 describes a method for assembling a box structure, which uses gluing for the assembly. This assembly method, known as fastener-free assembly, is entirely satisfactory and particularly makes it possible to increase productivity as compared to solutions of the prior art that chiefly use riveting. This type of assembly using gluing allows the assembled structure to carry away the service forces to which it is subjected. For example, when the assembly is used to make a wing box that is subjected to torsion loads, the interfaces glued in this way can carry away the forces between the skin and the understructure in nominal operating conditions. However, for aeronautics applications, the structure must be tolerant to damage, and in such a configuration, when a glued interface is damaged, it can no longer transmit forces in a shearing direction parallel to the interface, and does not offer an alternative path for the propagation of the flow of force. Thus, according to the prior art, assemblies that are vital for the safety of the aircraft, such as wing boxes, continue to be assembled by riveting even if the elementary parts making them up are made of composite materials. In addition to the adverse effect on the mass of the assembly made in that way, the installation of fasteners leads to a number of drawbacks in terms of productivity and the risk of scraps. Thus, the installation of each fastener requires drilling when the elementary parts are pre-assembled, inspection and, depending on the case, protection from the risk of sparking if it opens into an area containing fuel. Each of these operations is likely to generate defects; several thousands of fasteners are installed on a structure like a wing box, and some of the fasteners are installed with access to only one side of the skin, or with reduced access to the other face, because the box structure is closed by said skin.

Document EP 2 703 283 describes a composite structure of an aircraft wing assembled by gluing.

Document FR 2 576 279 describes the structure of a wing made of composite material and comprising the connection of a spar to the skins that make up the aerodynamic surfaces by means of brackets.

Document U.S. Pat. No. 5,847,375 describes a method for assembling a structure of stiffeners made of composite material with a thermoplastic matrix using welding.

OBJECT AND SUMMARY OF THE INVENTION

The invention is aimed at remedying the drawbacks of the prior art and therefore relates to a method for assembling a box structure comprising elementary parts assembled along an understructure of stiffeners and skins, wherein the understructure and skins are made of composite material with a polymer matrix, and wherein the method includes steps of:

a. sizing the box structure for the loads to which it is subjected and for a glued assembly of said structure;

b. obtaining a map of the loads on the structure and defining a first load limit depending on the probability of the structure being damaged;

c. assembling the understructure and the skins by gluing them;

d. in areas of the assembled box structure where the first load limit is reached, applying an additional layer that covers the assembled elementary parts.

Throughout the document, the term "area" refers to a cellular portion of the box structure, which is demarcated by the skins and the stiffeners.

Thus, said additional layer helps create an assembly between the skin and several stiffeners and offers an alternative path for carrying away forces between said stiffeners if there is any gluing defect, without the drawbacks of through fasteners in terms of mass, stress concentration, sealing risks or sparking.

The invention can be implemented advantageously in the embodiments described below, which may be considered individually or in any technically operative combination.

Advantageously, the method according to the invention comprises the steps of:

e. on the map obtained in step (b), determining the areas subjected to a second load limit, greater than the first limit, depending on the probability of the assembled structure being damaged;

f. in the areas of the assembled structure where the second load limit is reached, inserting through fasteners between the assembled elementary parts.

Thus, said fasteners provide additional safety but their use remains limited to areas subjected to high loads, or where tolerance to damage is required in severe conditions.

Advantageously, the operation of adding a layer in an area comprises placing a prepregged ply on the face of the skin glued to stiffeners of the understructure, which ply covers part of the skin and part of the base plates of the stiffeners in said area. Thus, the surface of the ply is substantially that of the area considered and the added mass is reduced. The additional layer cooperates with gluing between the stiffener base plates and the skin, in order to carry away the flows of force. The absence of fasteners makes it possible to use said area as a fuel tank by avoiding the specific treatment of fasteners in respect of sealing and the risk of sparking.

The invention also relates to an aircraft wing, wherein the box structure is obtained using the method according to the invention in any of its embodiments, and wherein said box comprises a central portion connecting it to the fuselage and comprises areas with additional layers at the ends. Thus, the reinforcing additional layers in the areas at the ends of the wing make it possible to strengthen the box structure to withstand incipient peeling between the skin and the stiffeners.

Advantageously, the wing according to the invention comprises an area assembled with fasteners in the central portion. Thus, that area, which is subjected to the greatest load and is most exposed to damage, is more particularly reinforced.

In a particular embodiment, the wing according to the invention comprises an area assembled by fasteners at the ends of the box structure. Thus, this area is additionally reinforced depending on the loads to which it is subjected.

In that last embodiment, the wing according to the invention comprises an area that is assembled only by gluing between the central portion and the end areas of the box structure. Said areas with no fastener are more particularly intended for storing fuel.

The invention also relates to aircraft comprising a wing according to any of the embodiments described above. The use of such a wing makes it possible to reduce the mass, cost and manufacturing time of such aircraft at the same time.

BRIEF DESCRIPTION OF THE DRAWINGS

The invention is described below in its preferred embodiments, which are not limitative in any way, and by reference to FIGS. 1 to 4, wherein.

DETAILED DESCRIPTION OF THE EMBODIMENTS

Figure 1:
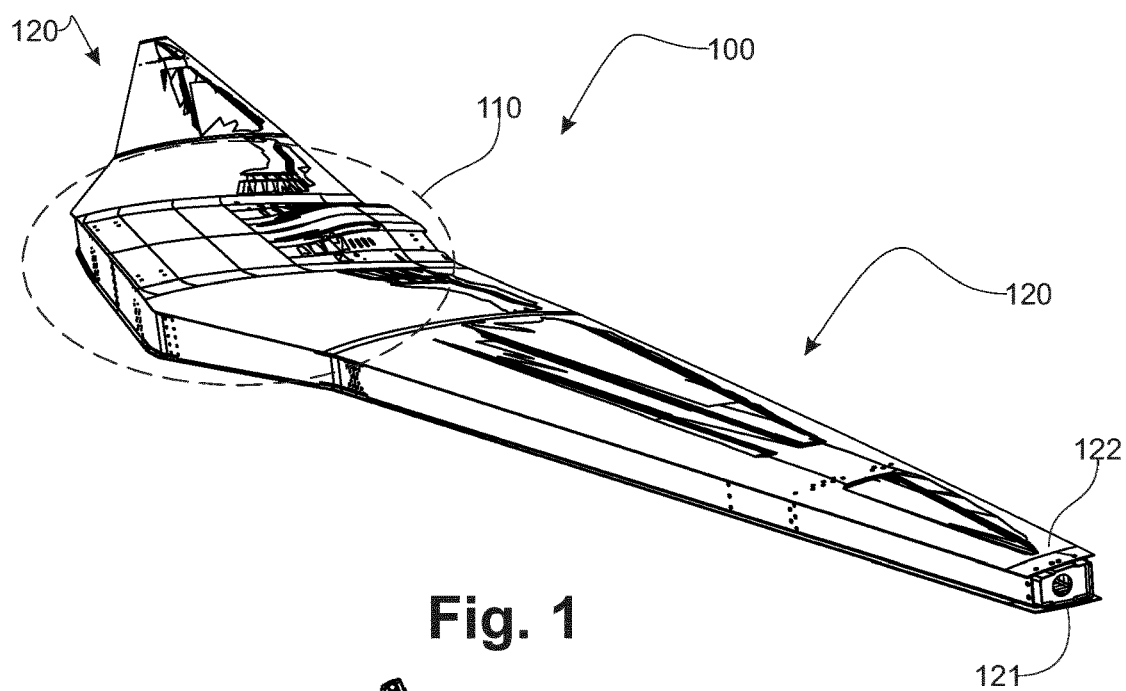
FIG. 1 is a perspective view of an exemplary embodiment of a wing according to the invention.

In FIG. 1 of an exemplary embodiment, the wing (100) according to the invention comprises a portion (110) known as the central portion, which connects said wing to the fuselage of the aircraft (not shown). The wings (120) extend on each side of that central structure. Each wing comprises a lower face (121) and an upper face (122) covered by a skin. As a non-limitative example, said wing is 14 meters long and its maximum width is approximately 2 meters at the root.

Figure 2:
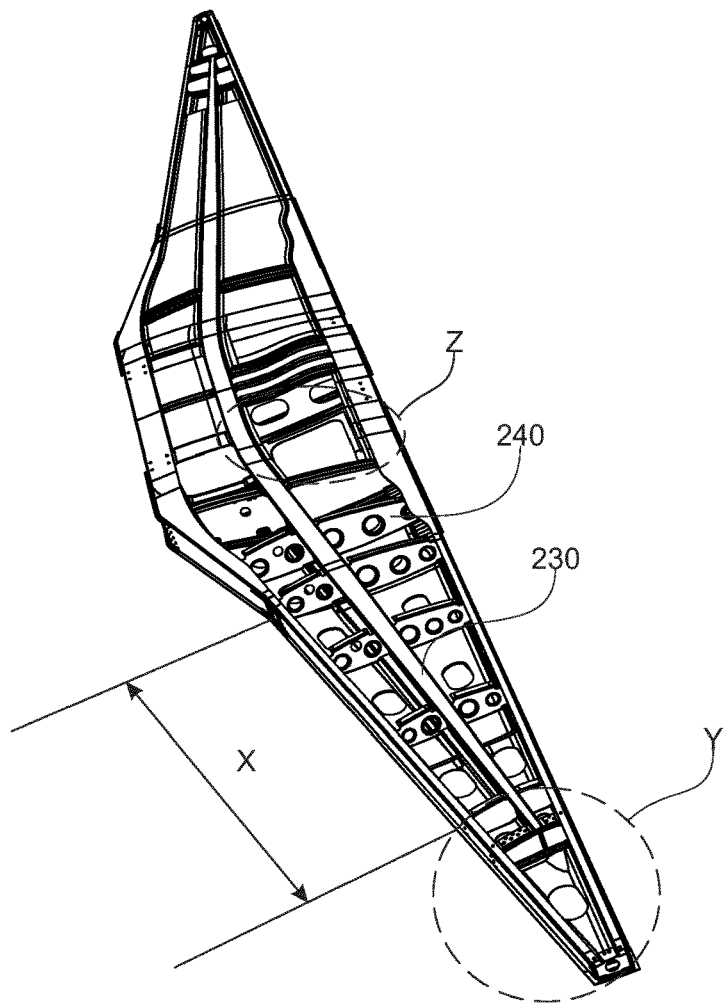
FIG. 2 is a perspective view of the wing in FIG. 1 where the upper face has been removed over half the wing.

In FIG. 2, said lower and upper (121, 122) faces are made up of composite skin panels that are fixed to a box structure comprising stiffeners known as spars (230) and stiffeners known as ribs (240) so that along with the skin, the stiffeners make up a box structure with cells. The term "skin" applies to an elementary part with thickness that is less than 1/30th of its other dimensions. From the mechanical point of view, such a skin may be assimilated with a shell, and a stiffener (230, 240) may be assimilated with a beam. In this exemplary embodiment, the stiffeners and the skins are made of laminated composite material comprising continuous fibers in a polymer matrix. As a non-limitative example, these are carbon fibers in a thermosetting matrix such as epoxy resin or a thermoplastic matrix made of polyetheretherketone (PEEK), polyphenylene sulfide (PPS) or polyetherimide (PEI). Depending on their nature, the spars and ribs are assembled to each other by joint curing, welding or gluing, or even fasteners; the assembly interfaces of that grille structure are accessible before the skins are installed. The skins are assembled to the stiffeners using a gluing method similar to that described in document WO 2013/038012.

Figure 3:
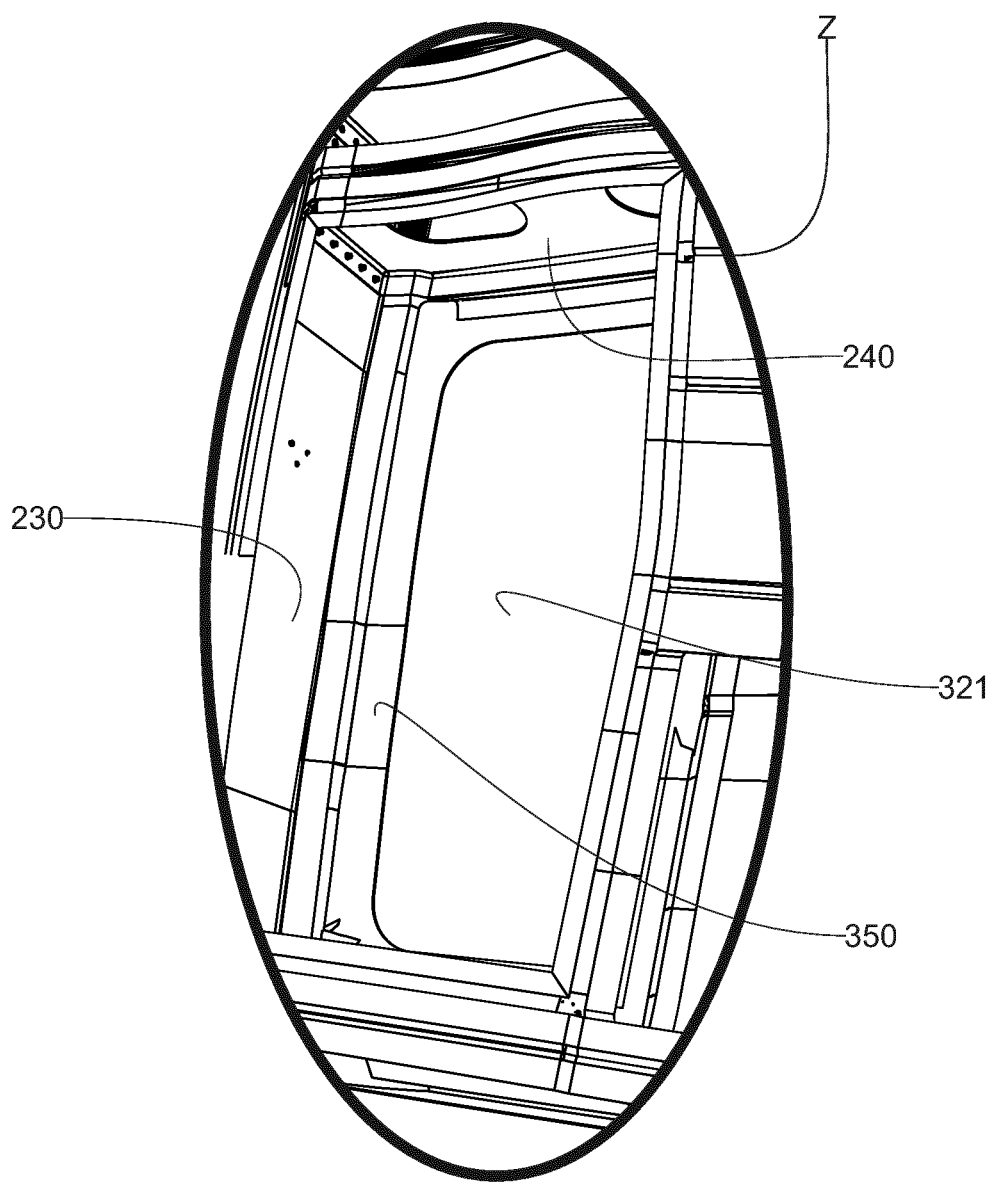
FIG. 3 is a detailed view along Z marked in FIG. 2 of the wing according to this exemplary embodiment.

In FIG. 3 of an exemplary embodiment, the assembly of the skin (321) that makes up the lower face with the base plates of the stiffeners (230, 240) in a central area of the wing comprises an additional layer (350) that extends between said stiffener base plate and the skin (321). As a non-limitative example, the additional layer (350) comprises two plies of prepregged carbon fibers. Said additional layer (350) is installed after the skin is glued to the stiffeners. Advantageously, it is cured simultaneously with the glue.

Figure 4:
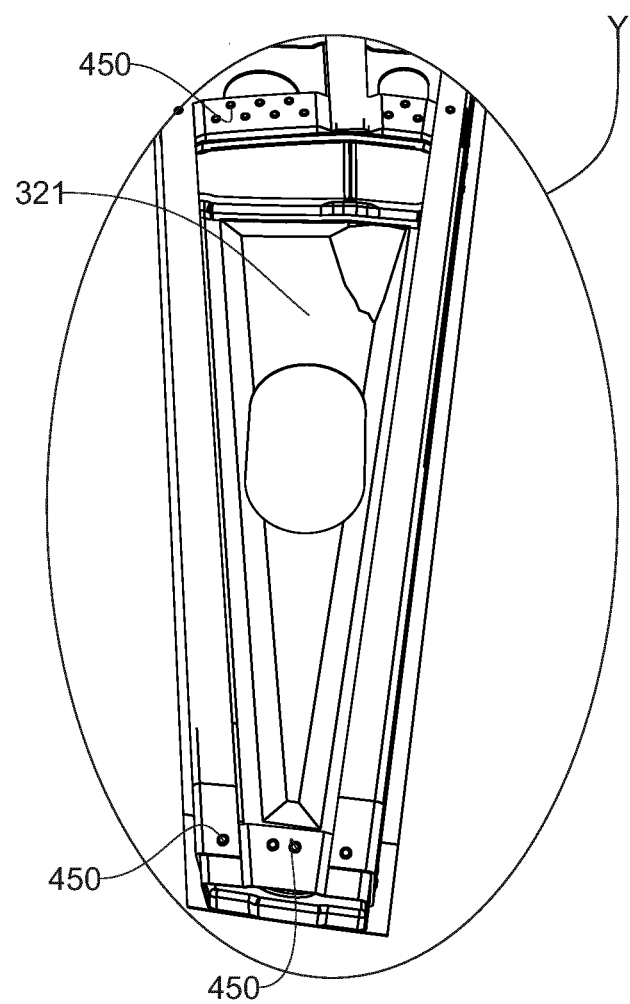
FIG. 4 is a detailed view along Y marked in FIG. 2 of the end of the wing according to an exemplary embodiment of the wing in the invention.

In FIG. 4 of an exemplary embodiment, the end (Y) of the wing comprises both an additional layer (350) shown here between a stiffener and the skin (321) of the lower face, and connection using through fasteners (450) between the stiffeners and the skins, the upper face panel in this case (not shown). The same type of combined assembly is used in the loaded areas of the central portion. In non-limitative exemplary embodiments, said fasteners are lock bolts known under the trade name LGP, or blind bolts. Said fasteners are preferably made of titanium alloy.

The same type of assembly combining fasteners and an additional layer or otherwise is used in the central part (Z) of the wing, which part is highly loaded and exposed, because of the closeness of the gear housing of the aircraft.

Returning to FIG. 2, in this exemplary embodiment, the areas in the intermediate portion (X) between the central portion (Z) and the end (Y) are assembled only by gluing the skins to the stiffeners.

The choice of the assembly mode depending on the area in question is made by means of a numerical simulation of the loads applied on the wing with definite loading cases; the simulation may for instance be carried out using finite-element analysis software. The areas subjected to loads that exceed a first limit are reinforced by an additional layer and the areas that exceed a second loading limit are reinforced by installing fasteners between the skin and the stiffeners concerned. In the example of the application of the method according to the invention to the making of an aircraft wing, the particularly loaded areas are located in the central portion that is connected to the fuselage and on the end rib that closes the end of the wing and provides a connection with the winglet at the end of the wing.

By comparison with the fully riveted solutions of the prior art, the method according to the invention makes it possible to divide the number of fasteners used by 10 to 100, for the same mechanical efficiency, in such a wing.

The method according to the invention is more particularly suited to making an aircraft wing; however, those skilled in the art can easily adapt its principles to other applications involving similar constraints in use.

The invention claimed is:

1. A method of assembling a box structure of an aircraft comprising elementary parts, assembled along an understructure of stiffeners, and skins, the understructure and the skins are made of composite material with a polymer matrix, and the method comprises the steps of sizing the box structure for subjected loads and for a glued assembly; obtaining a map of the loads on the box structure and defining a first load limit depending on a probability of the box structure being damaged; assembling the understructure and the skins by gluing them together; and applying an additional layer that covers the assembled parts in areas of the assembled box structure where the first load limit is reached.

2. The method according to claim 1, further comprising steps of determining areas subjected to a second load limit on the map of the loads, the second load limit being greater than the first load limit, depending on a probability of the assembled box structure being damaged; and inserting through fasteners between the assembled elementary parts in areas of the assembled box structure where the second load limit is reached.

3. The method according to claim 1, further comprising a step of placing a prepregged ply on a face of the skin glued to the stiffeners of the understructure in an area of the assembled box structure where the first load limit is reached, the prepregged ply covering a part of the skin and a part of base plates of the stiffeners in the area of the assembled box structure where the first load limit is reached.

4. An aircraft wing comprising a box structure comprising elementary parts, assembled along an understructure of stiffeners, and skins, wherein the understructure and the skins are made of composite material with a polymer matrix, wherein the box structure is sized for subjected loads and for a glued assembly, wherein the understructure and the skins are glued together; first areas of the assembled box structure with additional layers to cover the assembled parts where a first load limit is reached, the first load limit being dependent on a probability of the box structure being damaged; a central portion connectable to a fuselage; and second areas with the additional layers at the ends of the box structure.

5. The aircraft wing according to claim 4, further comprising an area assembled with fasteners in the central portion.

6. The aircraft wing according to claim 5, further comprising an area assembled with the fasteners at the ends of the box structure.

7. The aircraft wing according to claim 6, further comprising an area assembled only with a glue between the central portion and the ends of the box structure.

8. An aircraft comprising the aircraft wing according to claim 4.

* * * * *